Dec. 11, 1951 R. A. MEERS ET AL 2,577,792

ELECTRIC WAVE REPEATER CIRCUIT

Filed Aug. 19, 1947 2 SHEETS—SHEET 1

Inventor
Richard Rodney Meers
Ernest Ronald Ackelbaum
Gurney Oliver Probert
By R P Morris
Attorney Dec. 11, 1951 R. A. MEERS ET AL 2,577,792

ELECTRIC WAVE REPEATER CIRCUIT

Filed Aug. 19, 1947 2 SHEETS—SHEET 2

Inventor
Richard Adney Meers
Ernest Ronald Cockburn
Gurney Oliver Probert
By R. P. Morris
Attorney Patented Dec. 11, 1951 2,577,792

UNITED STATES PATENT OFFICE 2,577,792

ELECTRIC WAVE REPEATER CIRCUIT

Richard Adney Meers and Ernest Ronald Cockbain, London, and Gurney Oliver Probert, deceased, late of Uplands, Meopham Green, England, by Isobel Morrison Probert, widow and executrix, Bedhampton, Havant, England, assignors to International Standard Electric Corporation, New York, N. Y., a corporation of Delaware Application August 19, 1947, Serial No. 769,368
In Great Britain October 6, 1939

Section 1, Public Law 690, August 8, 1946
Patent expires October 6, 1959

13 Claims. (Cl. 179—170)

1

The present invention relates to electric wave repeater circuits and one of its objects is to overcome certain limitations which are present in existing repeaters. Another object is to effect a saving in size, weight and power consumed in order that the repeater may be suitable for use as a portable device, e. g. for military purposes.

According to the invention, in an electric wave repeater circuit employing a variable attenuator of the dry contact rectifier type in the transmission circuit, in which a limiting device is connected in the input circuit to said attenuator so as to prevent the voltage applied to said attenuator from rising above a predetermined value.

Also a two-way electric wave repeater circuit in which the input of each side of the repeater is directly connected to the output of the other side, means being provided to permit only one side of the repeater to be operative at a time.

Figure 1:
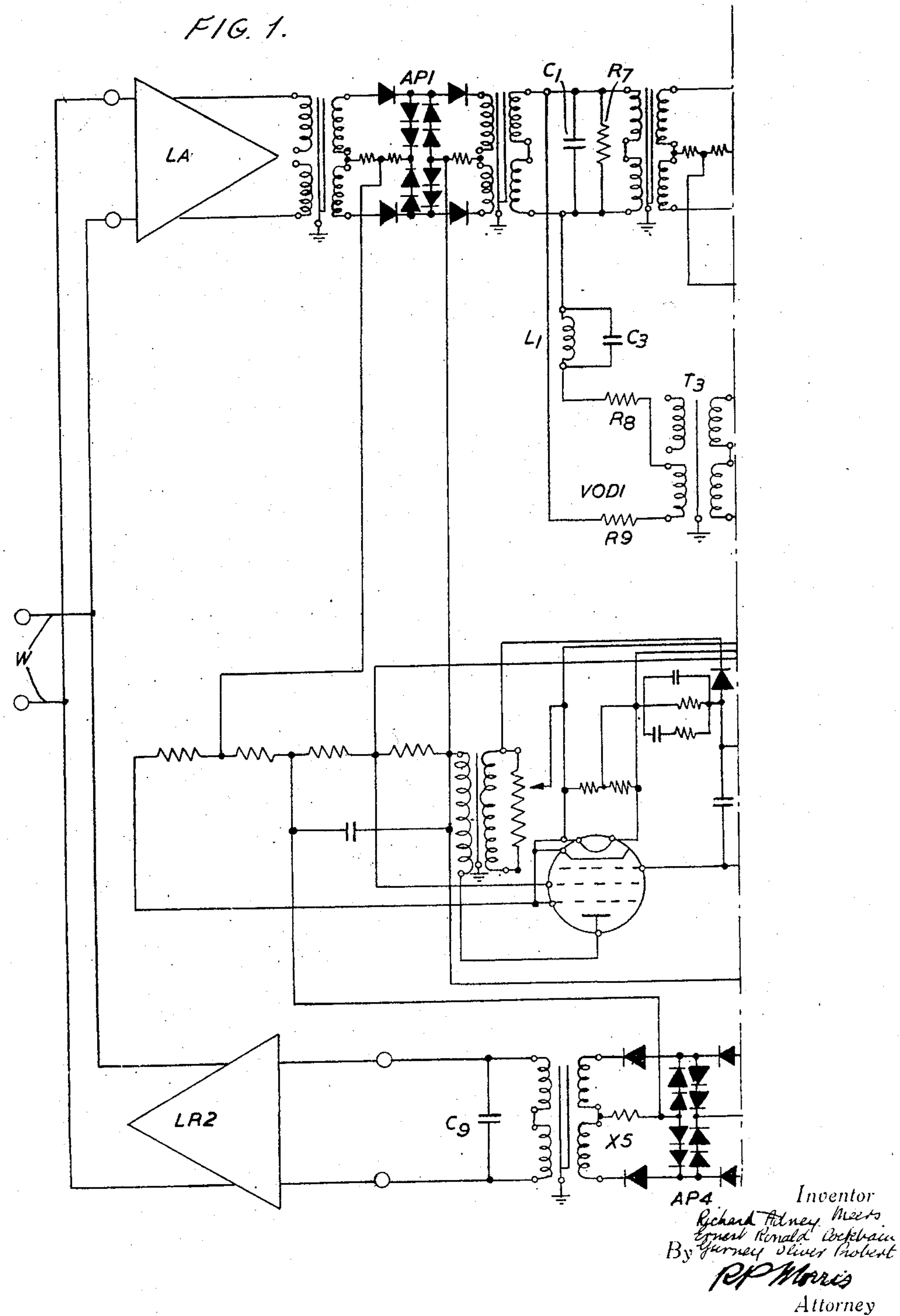
Figure 2:
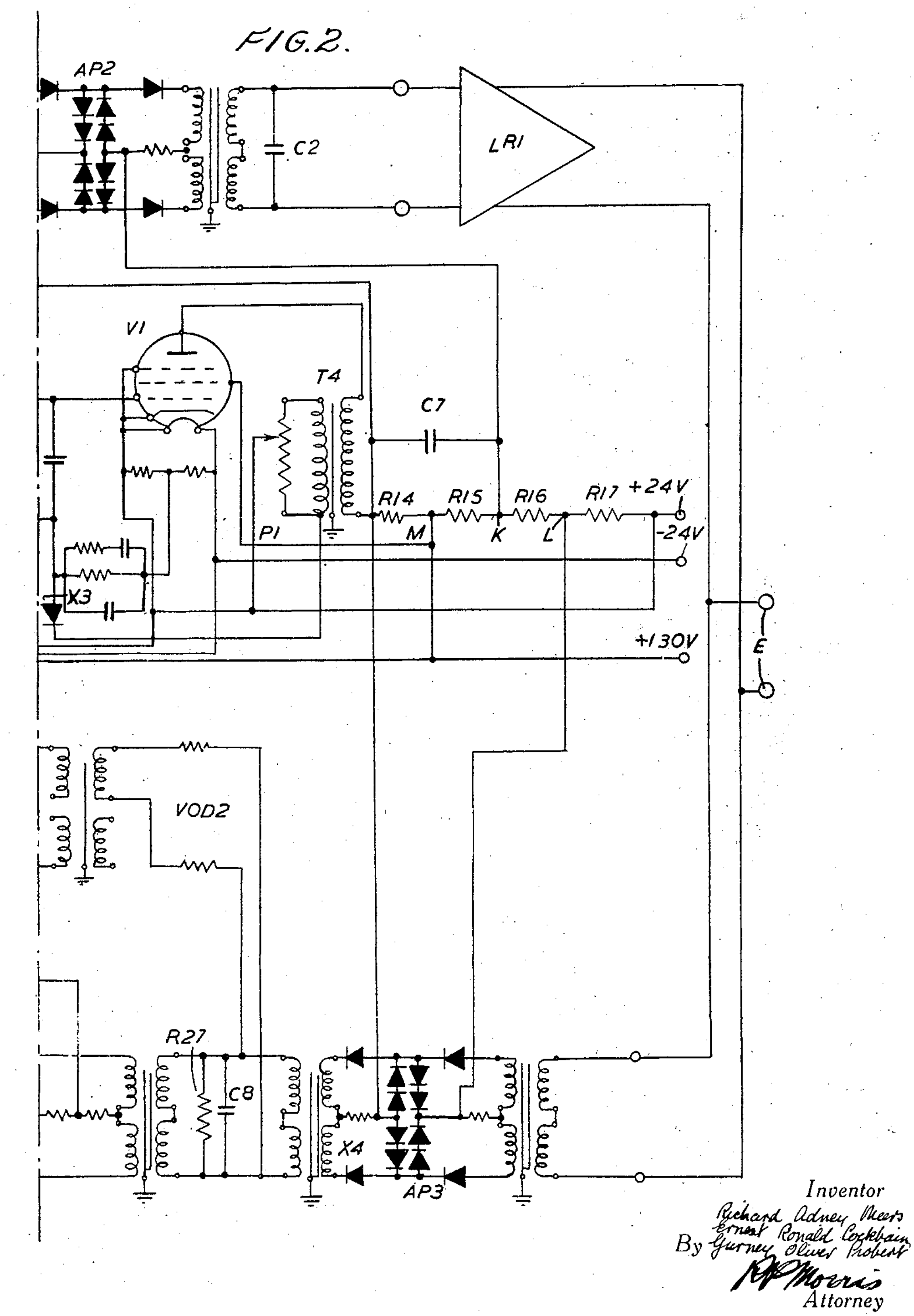

An embodiment of the invention will now be described, by way of example, reference being made to the accompanying drawings wherein Figs. 1 and 2 schematically show the circuit arrangement of a voice-switched thermionic valve repeater.

The repeater shown is a two-way repeater connected between a two-way line W and a near subscriber's line E. The W—E side of the repeater includes a limiting amplifier LA, variable attenuator pads AP1 and AP2 of the dry contact rectifier type and a line repeater LR1. The E—W side of the repeater includes variable attenuator pads AP3 and AP4 of the dry contact rectifier type and a line repeater LR2.

The limiting amplifier LA is included to meet special requirements and may be omitted when the voice switched repeater is used under ordinary conditions. The repeater will therefore first be described as if the limiting amplifier were omitted and replaced by a straight through circuit. The pad AP1 is normally in a low loss condition and the pad AP2 in a high loss condition. The amplifier LR1 may consist of any amplifier having a suitable gain and output. For instance, it has been found very satisfactory to use one half of a 4-wire repeater, the other half being used for the corresponding amplifier LR2 in the reverse direction. Bridged across the junction between pad AP1 and pad AP2 is a voice operated device VOD1 which operates in such a way as to bring pad AP2 to a low loss condition when an input is applied from the line W. This device also operates pad AP3 in the E—W half of the repeater changing it from the low loss condi-

2 tion to the high loss condition when an input is applied from the line W. The return half of the repeater is exactly similar, pads AP3 and AP4 replacing pads AP1 and AP2 and the amplifier LR2 replacing the amplifier LR1. The voice operated device associated with this side is identical with that for the first side but operates on pads AP4 and AP1 instead of pads AP2 and AP3.

The method of operation of the voice operated device VOD1 is as follows. The voice input is amplified by a valve V1 and by the principle of rectified reaction a part of the output of V1 is employed to reduce the anode current of V1. The D. C. control current through the rectifier pads AP2 and AP3 associated with the device VOD1 depends upon the anode current of the valve V1 since it is taken from a bridge arrangement of which V1 forms one arm.

Considering the W—E side, the circuit will now be described in more detail. The input to the device VOD1 is derived across the primary winding of a transformer T3 through the series resistances R8 and R9. These resistances are inserted in order to give the device a high input impedance and so decrease the bridging loss. In addition, it will be seen that a shunt resonant circuit L1, C3 is included in series with R8, which increases the input impedance of the device at the frequency of resonance thereby rendering it less sensitive at that frequency. This gives protection against false operation by high frequency cross-talk currents, and is particularly important when the gain of the amplifiers is caused to rise at the high frequencies in order to provide line equalisation. The output of the transformer T3 is applied to the control grid of the valve V1 where it is amplified and taken to the output transformer T4. Part of the output is tapped from a potentiometer P1 bridged across the secondary winding of the transformer T4 and is applied to the rectifier X3 which, it will be seen, is in the grid circuit of V1. In this way a certain amount of the output of V1 is rectified and is applied as a negative bias to the control grid of V1. The result is that for a large input the anode current of V1 is reduced to such a value that a state of equilibrium exists between the gain of V1 and the input level. In practice the effect is to reduce the anode current of V1 to an extremely small value and for the purpose of description it may be assumed that it is reduced to zero. The anode current of V1 is supplied from a 130-v. battery through the resistance R14 and the primary winding of the transformer T4. In addition, there is a potentiometer device between +130-v. battery and earth consisting of the resistances R15, R16 and R17. Resistances R14, R15, R16 and R17 may have the values 21,000 ohms, 8,000 ohms, 200 ohms and 6,000 ohms respectively. It will be seen from the drawing that the points K and L at the junction of R15 and R16 and of R16 and R17 respectively, are at constant potential, while the point M at the junction of resistance R14 and the primary winding of T4 is at a potential dependent upon the anode current of the valve V1, i. e. upon the voltage drop through resistance R14.

The D. C. control current for pad AP2 is obtained from the points M and K, and that for the pad AP3 from the points M and L. In the idle condition of the circuit, the valve V1 has approximately 8 ma. anode current and the point M is at a potential below that of points K and L. The control current in pad AP2 therefore flows through K to M and in pad AP3 from L to M and the rectifier networks in the pads are so arranged that in this condition the pad AP2 has maximum loss and the pad AP3 has minimum loss. On the application of a voice input to transformer T3 the anode current of the valve V1 is reduced to zero with the result that point M is now at a potential higher than that of both K and L. The current in both pads AP2 and AP3 is therefore reversed and pad AP2 is brought to the low loss condition. The purpose of differentiating between the points K and L for the two pads is that during the process of switching, pad AP3 shall have a considerable reverse bias applied to the series rectifiers before the reverse bias on the corresponding rectifiers in pad AP2 is removed. In this way the total attenuation of the two pads in series during the course of the switching process is never reduced below about 40 db whereas if the points K and L were the same, the total loss when there was no control current through either pad would only be of the order of 15 or 20 db. This is of importance in ensuring that there is no false operation of the "reverse" side of the repeater during the course of switching resulting from the application of an input to the "go" side.

In addition, the condenser C7 is connected in parallel with the D. C. control circuit to pad AP2 which has the effect of slightly slowing up its operation. This gives still further protection against false operation. It will also be seen that resistance R7 and condenser C1 are connected in shunt across the transmission path at the output of pad AP1 and condenser C2 in shunt across the output of pad AP2, similarly resistance R27 and condenser C8 are connected in shunt across the output of pad AP3, and condenser C9 is connected in shunt across the output of pad AP4. The purpose of the resistances R7 and R27 is to reduce the impedances seen looking into pads AP2 and AP4 when these pads are in the high loss condition. If R7 and R27 were omitted, these pads would have a very high input impedance in this condition so that the tendency would be to build up a large voltage across the input of VOD1 and VOD2 whenever a disturbance was present. By reducing the impedance of the circuit in this condition this danger is considerably decreased. The condensers C1 and C2 in the W—E side and C8 and C9 in the E—W side serve to increase the loss of the pads at high frequencies where it is known that their attenuation in the high loss condition is falling away slightly. They have practically no effect on the characteristic of the pads in the pass condition since the impedance is then low (600 ohms). In the high loss condition, however, the impedance increases and the shunt effect of the condenser increases at the same time.

Owing to the use of the voice operated devices VOD1 and VOD2 it is possible to dispense with the hybrid coils and balancing networks usually provided, and to connect the inputs and outputs of the two halves of the repeater directly together. There is thus no attempt to balance the line under any conditions. This involves certain limitations on the operation of the circuit owing to the characteristics of the rectifier pads, which suffer a considerable decrease in attenuation in their high loss condition when the input level to the pad exceeds a certain critical value. Nevertheless, the circuit has proved very satisfactory during tests and a very considerable saving in both size and weight has been effected.

It has been found that the dry contact rectifier type attenuator pads employed for providing attenuation in the transmission path which is not being used are all subject to severe limitations as to output level of that side of the repeater which is in use. The reason for this is that the rectifier pads retain their full attenuation in the high loss condition only up to an input level of a certain critical value. If a level above this value is applied, the A. C. voltage developed across the series rectifiers tends to exceed the value of the reverse bias applied from the control circuit. The peaks of the waves are therefore subject to half wave rectification and are able to get through the pad with comparatively small loss.

In this kind of repeater the return side is protected from false operation by unbalance currents from the go side by means of an attenuator pad in the high loss condition. It will be seen therefore that if the output level from the go side is greater than the critical value of the pad in question there is serious danger of false operation. This can be improved to a certain extent by application of a greater reverse bias to the rectifiers in the high loss condition but this is subject to practical limitations and it has been found in fact that it is undesirable to operate a circuit of this type unless it can be ensured that the unbalance level incident upon the protecting pad is less than about 5.9 milliwatts. In general, this condition can be arranged for when employing hybrid coils since it is nearly always possible to obtain a balance in the hybrid coils of say 10 db which means that the output level permissible from the go side of the repeater is approximately +10 with reference to 5.9 mw. In the case of the simplified voice switched repeater showing the drawing where the hybrid coils are omitted and the output of the E—W repeater is connected directly across the input of the W—E repeater and in cases where a higher output level than +10 is required, other means must be provided to improve the protection against false operation.

Any protecting device used in accordance with the preceding paragraph must be of such a nature as not to affect the transmission of speech through the repeater, but must only affect the crosstalk currents from the output of the E—W side where they are applied to the input of the W—E side. This can readily be effected by the use of a limiting amplifier. If such an amplifier is included in the circuit immediately before the first rectifier pad AP1 (as shown at LA), it will be seen that for through speech which enters the repeater at a comparatively low level the amplifier may have full gain and its limiting output level need not be exceeded.

At the same time the crosstalk currents which arrive at high level from the other side of the repeater may be such as to bring the limiting amplifier to its limiting condition and are therefore subject to considerable attenuation. Considering the present case where the input to the pad AP1 to ensure that false operation does not occur must be kept below 5.9 mw., a limiting amplifier might be employed which would limit at —10 db with reference to 5.9 mw. Under normal conditions where the speech arrives at a reasonably high level and a high output level is required, the limiting amplifier would probably be made to have zero gain and as regards through circuit operation the device would operate exactly as if the amplifier were not present. The high output level from the E—W side of the repeater incident upon the W—E side would not be able to be transmitted by the amplifier on to the pad AP1 at a level exceeding —10 db ref. 5.9 mw. It is known that the pad has its full attenuation under this condition and therefore there is no danger of false operation.

The above considerations are intended to apply to the use of the repeater in an intermediate position on a 2-wire circuit. Under certain conditions, e. g. for military use, it may be extremely desirable to situate the repeater at one end of the line since it may be impossible to find a suitable position for its installation between terminals. The case is then even more difficult since the receive (W—E) side of the repeater must have a high sensitivity to be able to operate on the weak speech currents received from the far end of the line, while the output level from the send (E—W) side of the repeater must be high in order that the speech when attenuated by the line shall be intelligible at the far end. There is then a high output level cross-talking into the side whose sensitivity has been increased and the danger of false operation is very much greater than that encountered in an intermediate repeater. It has been found in fact practically impossible to operate a repeater under these conditions except by the use of a limiting amplifier in the manner described in the preceding paragraph. When a limiting amplifier was included however, it was found possible to operate the repeater at one end of a 40 db line with a gain of approximately 32 db at each side. The line was, therefore, capable of operation with an 8 db equivalent and the general transmission was found to be extremely satisfactory. In particular in the case of a terminal repeater the limiting amplifier LA may be made to serve a double purpose since not only does its limiting characteristic give protection against false operation, but at the same time the amplifier LA may be made to have a considerable gain for low input levels such as those received as speech currents from the far end and it thus serves to increase the sensitivity of the receive side.

What is claimed is:

1. A two-way electric wave repeater comprising two paths, each path comprising an input and an output end, a variable attenuator of the dry contact rectifier type in each path, means coupling the output end of each path to the input end of the other path, means for preventing input signals applied to one of said attenuators from rising above a predetermined value and for substantially preventing feedback from the output end of the other path to the input end of said one path caused by said coupling comprising a limiting amplifier coupled to the input end of said one path.

2. An arrangement according to claim 1, wherein said coupling comprises a direct connection.

3. An arrangement according to claim 1 further comprising an electric wave operated device for each path responsive to signals in its associated path for controlling the attenuation of each of said attenuators in opposite directions.

4. An arrangement according to claim 3, wherein each of said attenuators comprises an input end attenuator and an output end attenuator, each of said devices responsive to input signals appearing at its respective input end attenuator for controlling its output end attenuator and the input end attenuator of the other path.

5. An arrangement according to claim 1 wherein each of said attenuators comprises an input end attenuator and an output end attenuator, each of said devices comprising an input circuit coupled to a responsive input end attenuator and its output circuit coupled to its respective output end attenuator and the input end attenuator of the other path.

6. An arrangement according to claim 4, wherein said input end attenuators are normally in a low loss condition and the output end attenuators are in a high loss condition.

7. A two-way electric wave repeater circuit comprising two transmission paths, each path comprising an input and an output end, each path having connected therein an input end attenuator pad and an output end attenuator pad, means coupling the output end of each path to the input end of the other path, an electric wave operated device for each path including a valve responsive to electric waves appearing at the input end of its respective path for controlling the attenuation of said attenuators, each of said devices being responsive to input signals appearing at its respective input end attenuator for controlling the corresponding output end attenuator and the input end attenuator of the other path.

8. An arrangement according to claim 7, wherein each of said devices comprise a valve in which a portion of the output of said valve is fed back to its input by a rectifier to apply a negative bias to the control grid of said valve.

9. An electric wave repeater circuit as claimed in claim 8, in which each of said variable attenuator pads of each path are connected in series and said wave operated devices are connected to the junction point of respective attenuators of each path for controlling an output end attenuator of a corresponding path and an input end attenuator of said other path.

10. An electric wave repeater circuit as claimed in claim 9, in which said devices are operatively connected to respond to voice currents to effect a decrease in the attenuation of said output end attenuator in the corresponding path and an increase in the attenuation of the input end attenuator of said other path.

11. An electric wave repeater as claimed in claim 10, in which each of said voice operated devices are operative to effect a slight increase in attenuation of said input end attenuators before said decrease in attenuation in said corresponding path's output attenuator is effected.

12. An electric wave repeater as claimed in claim 11 wherein the attenuation of said pads is controlled by voltages developed across a voltage dividing network connected in the output circuit of said devices.

13. An electric wave repeater as claimed in claim 12 and further comprising a condenser connected across the input to said output attenuator pads from respective of said devices so as to effect said delay in attenuation decrease.

RICHARD ADNEY MEERS.
ERNEST RONALD COCKBAIN.
ISOBEL MORRISON PROBERT,
*Widow and Executrix of Gurney Oliver Probert, Deceased.*

REFERENCES CITED

The following references are of record in the file of this patent:

UNITED STATES PATENTS

| Number | Name | Date |
|---|---|---|
| 1,880,889 | Doba, Jr. | Oct. 4, 1932 |
| 2,034,703 | Metzger | Mar. 24, 1936 |
| 2,066,325 | Bjornson et al. | Jan. 5, 1937 |
| 2,143,407 | Chestnut | Jan. 10, 1939 |

FOREIGN PATENTS

| Number | Country | Date |
|---|---|---|
| 503,418 | Great Britain | Apr. 5, 1939 |